(12) United States Patent
Wang et al.

(10) Patent No.: US 10,645,715 B2
(45) Date of Patent: May 5, 2020

(54) SPLITTING SCHEDULING SYSTEM AND METHOD THEREOF FOR INTEGRATING HETEROGENEOUS NETWORK

(71) Applicant: Chunghwa Telecom Co., Ltd., Yangmei, Taoyuan County (TW)

(72) Inventors: Po-Hsueh Wang, Yangmei (TW); Yao-Chun Tsou, Yangmei (TW); Sz-Hsien Wu, Yangmei (TW); Chung-Ho Wang, Yangmei (TW); Chia-Horng Liu, Yangmei (TW)

(73) Assignee: Chunghwa Telecom Co., Ltd., Yangmei (TW)

(*) Notice: Subject to any disclaimer, the term of this patent is extended or adjusted under 35 U.S.C. 154(b) by 81 days.

(21) Appl. No.: 15/367,746

(22) Filed: Dec. 2, 2016

(65) Prior Publication Data
US 2017/0359831 A1    Dec. 14, 2017

(30) Foreign Application Priority Data
Jun. 8, 2016    (TW) ............... 105118319 A

(51) Int. Cl.
*H04W 72/12* (2009.01)
*H04W 40/00* (2009.01)

(52) U.S. Cl.
CPC ....... *H04W 72/1226* (2013.01); *H04W 40/00* (2013.01)

(58) Field of Classification Search
CPC .. H04W 72/1226; H04W 16/24; H04W 76/00
See application file for complete search history.

(56) References Cited

U.S. PATENT DOCUMENTS

| | | | |
|---|---|---|---|
| 8,767,536 B2 | 7/2014 | Himayat et al. | |
| 9,119,154 B2 | 8/2015 | Etemad et al. | |
| 2014/0342748 A1 | 11/2014 | Zou | |
| 2015/0092553 A1* | 4/2015 | Sirotkin | H04W 48/16 370/235 |
| 2017/0053258 A1* | 2/2017 | Carney | H04L 43/08 |
| 2017/0180999 A1* | 6/2017 | Alderfer | H04W 16/14 |
| 2017/0290021 A1* | 10/2017 | Choi | H04W 72/06 |

FOREIGN PATENT DOCUMENTS

WO    2016/043377    3/2016

* cited by examiner

*Primary Examiner* — Kevin C. Harper
*Assistant Examiner* — Derrick V Rose
(74) *Attorney, Agent, or Firm* — Amin, Turocy & Watson, LLP

(57) ABSTRACT

A splitting scheduling system and method thereof for integrating heterogeneous network is provided. The system includes one or multiple wireless router, a mobile network core system, and a heterogeneous network router. When an external terminal device is located in a service covering range of the heterogeneous network router and the wireless router and the terminal device has a heterogeneous network integrating access condition, then the heterogeneous network router enables the terminal device to communicate with heterogeneous network router and the wireless router in the same time. The system further assigns a downlink traffic splitting ration to the terminal device according to individual communication status of the wireless router and the heterogeneous network router so as to provide a better communication quality.

6 Claims, 4 Drawing Sheets

SPLITTING SCHEDULING SYSTEM AND METHOD THEREOF FOR INTEGRATING HETEROGENEOUS NETWORK

This application claims priority of Application No. 105118319 filed in Taiwan, R.O.C. on Jun. 8, 2016 under 35 U.S.C. § 119, the entire contents of which are hereby incorporated by reference.

BACKGROUND OF THE INVENTION

1. Field of the Invention

The present invention is a splitting scheduling system and a method thereof, and particularly refers to a splitting scheduling system for integrating heterogeneous network and a method thereof.

2. Brief Description of the Prior Art

As handheld wireless devices are becoming more ubiquitous, the demand on network bandwidth gradually increases, thereby resulting in network congestion in the licensed spectrum. In addition, the explosive growth of data resulting from various multimedia applications further causes the transmission rate to be insufficient to satisfy a user's expectation, in addition to insufficient bandwidth and other problems.

However, currently, increasing network capacity and transmission technologies can be substantially divided into three directions: (1) increasing network bandwidth; (2) improving the efficiency of system spectrum; and (3) increasing the provisioning density of stations or provisioning small cells. Among the above three technical directions of increasing network capacity and transmission rate, the method of increasing network bandwidth is the simplest with the most significant effect. Existing wireless transmission only adopts a single wireless communication technology to transmit data and thus the transmission rate of data purely depends on the specification and transmission capability of said wireless communication technology.

The prior art of "Opportunistic carrier aggregation for dynamic flow switching between radio access technologies" (U.S. Pat. No. 9,119,154 B2) discloses adding a multi-Radio Access Technology (RAT) and an aggregation and coordination (MRAT-AC) module to a heterogeneous network router and RRC in the terminal to determine whether to use a mobile network and a wireless network in the same time and utilizing the information acquired by the mobile network terminal (including the information of the wireless network terminal) to realize the effect of offloading the mobile network to the wireless network. However, the application does not disclose the actual splitting scheduling method.

In addition, the prior art of "Multi-radio communication between wireless devices" (U.S. Pat. No. 8,767,536 B2) discloses a technical proposal of using two different wireless communication protocols to transmit data and re-determining the resource proportion of splitting according to whether the loads for the two communication protocols are unbalanced beyond the limit. However, the method only considers the load amount of the system, resulting in the inability of the system to provide a terminal device with better link quality.

In summary, how to provide a splitting mechanism that may integrate heterogeneous network is a technical problem in the art which needs to be urgently solved.

SUMMARY OF THE INVENTION

To solve the previous technical problems, one objective of the present application is providing a technical means for splitting scheduling for integrating heterogeneous network.

To reach the above object, the present invention proposes a splitting scheduling system for integrating heterogeneous network. The above system comprises one or more wireless routers, a mobile network core system and a heterogeneous network router. The above wireless router is used for providing the on-line equipment with wireless network service. The above heterogeneous network router connects the mobile network core system with the wireless router so as to provide the on-line equipment with mobile network service. When an external terminal device is located in the service covering range of the heterogeneous network router and the wireless router, and the terminal device has a heterogeneous network integrating access condition, the heterogeneous network router enables the terminal device to communicate with the heterogeneous network router and the wireless router at the same time and assigns a downlink traffic splitting ration to the terminal device according to a communication status of the wireless router and the heterogeneous network router, respectively.

To reach the above object, the present invention proposes a splitting scheduling method for integrating heterogeneous network, applied to a splitting scheduling system and comprising the steps of: firstly, determining whether an external terminal device is located in a service covering range of a heterogeneous network router and one or more wireless router, then enabling the heterogeneous network router to determine whether the terminal device has a heterogeneous network integrating access condition, then the heterogeneous network enables the terminal device to communicate with the heterogeneous network router and the wireless router at the same time, and assigns a downlink traffic splitting ration to the terminal device according to a communication status of the wireless router and the heterogeneous network router respectively.

In summary, the splitting scheduling system for integrating heterogeneous network and the method thereof according to the present invention assigns the downlink traffic splitting ration by analyzing the communication status of the wireless router and the heterogeneous network router with the terminal device respectively, thereby providing the terminal device with better communication quality.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE PREFERRED EMBODIMENT

The following description is about embodiments of the present invention; however it is not intended to limit the scope of the present invention.

Figure 1:
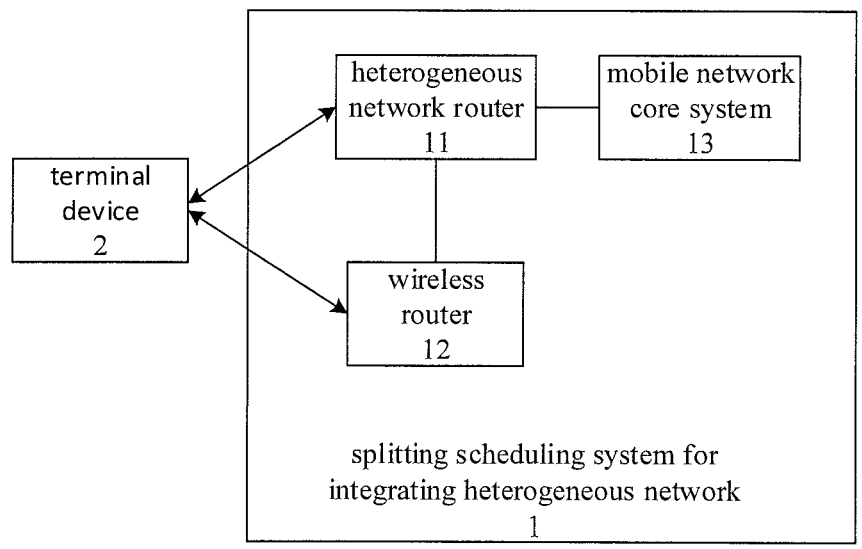
FIG. 1 is a system block diagram of the first embodiment of the present invention, showing a splitting scheduling system for integrating heterogeneous network.

Please refer to FIG. 1, showing a system block diagram of a splitting scheduling system 1 for integrating heterogeneous network, as the first embodiment of the present invention. The above splitting scheduling system further comprises a heterogeneous network router 11, one or more wireless routers 12, and a mobile network core system 13. The above wireless router 12 is used for providing the on-line equipment with wireless network service. The above heterogeneous network router 11 connects the mobile network core system 13 and the wireless router 12 so as to provide the on-line equipment with mobile network service, wherein the technical specification of the transmission of the mobile network service adopts international communication standards, such as: CDMA, WCDMA, HSPA, HSPA+, LTE, WiMAX, LTE-A and the like.

When the external terminal device 2 is located in the service covering range of the heterogeneous network router 11 and the wireless router 12, and the terminal device 2 has a heterogeneous network integrating access condition, the heterogeneous network router 11 enables the terminal device 2 to communicate with the heterogeneous network router 11 and the wireless router 12 in the same time and assigns a downlink traffic splitting ration to the terminal device 2 according to a communication status of the wireless router 12 and the heterogeneous network 11 router respectively.

The above splitting scheduling technical proposal is a technology that transmits downlink traffic according to the calculated splitting ration of the mobile network and the wireless network through the heterogeneous network router 11 executing the splitting scheduling when the terminal device 2 is located in an environment of overlapping covering range of the heterogeneous network and the wireless network. When the heterogeneous network integrating terminal transmits the downlink traffic, the mobile network and the wireless network start service simultaneously and the mobile network is required to utilize the mobile network and the wireless work to transmit simultaneously. The heterogeneous network assigns the downlink traffic of the heterogeneous network integrating terminal to the mobile network and the wireless network according to the splitting scheduling and by using the statuses of the mobile network, the wireless network and the terminal, improvements may be achieved in increased transmission rate of the downlink traffic, shortened waiting time of the user and the load balance between the mobile network and the wireless network.

In another embodiment, the above communication status further comprises at least one of the loading level, the transmission rate, the signal strength, and the service interruption probability. In another embodiment, the above load level further comprises at least one of the usage rate of RB (Resource Block), the BSS (Basic service set) load, the on-line number of RRC (Radio resource control), the ratio of actual throughput and theoretical throughput, the usage rate of channel, and the CPU (Central processing unit) loading of a device. In another embodiment, the above signal strength further comprises at least one of the RSSI (Received signal strength indicator) value, the SNR (Signal-to-noise ratio) value and the RSRP (Reference signal receiving power) value. In another embodiment, the above service interruption possibility further comprises at least one of the packet loss ratio and the packet delay rate.

Figure 2:
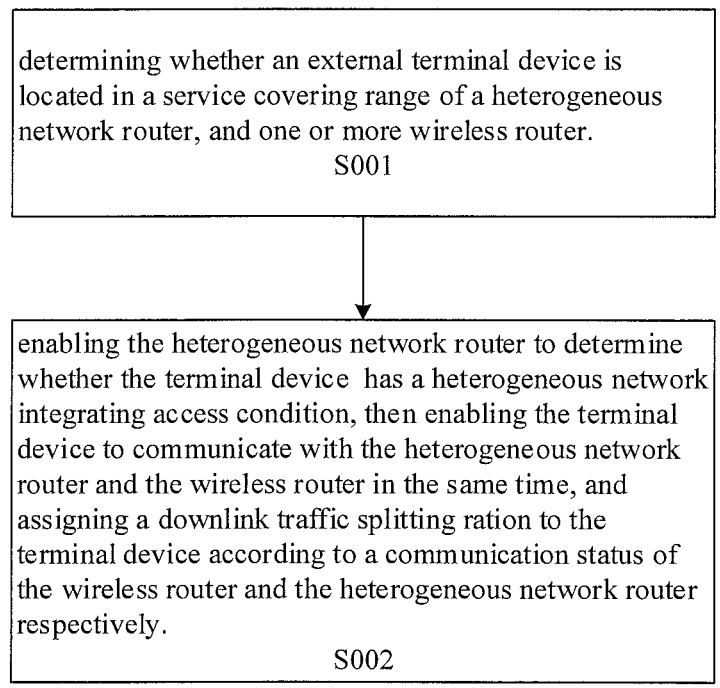
FIG. 2 is a flow chart of the second embodiment of the present invention, showing a splitting scheduling method for integrating heterogeneous network.

Please refer to FIG. 2, showing a flow chart of the second embodiment of a splitting scheduling method for integrating heterogeneous network applied to the above splitting scheduling system according to the present invention, comprising the following steps:

S001: determining whether an external terminal device 2 is located in a service covering range of a heterogeneous network router 11, and one or more wireless routers 12 of the splitting scheduling system.

S002: enabling the heterogeneous network router 11 to determine whether the terminal device 2 has a heterogeneous network integrating access condition, then the heterogeneous network router 11 enabling the terminal device 2 to communicate with the heterogeneous network router 11 and the wireless router 12 in the same time, and assigning a downlink traffic splitting ration to the terminal device 2 according to a communication status of the wireless router 12 and the heterogeneous network router 11 respectively.

In another embodiment, the above communication status further comprises at least one of the load level, the transmission rate, the signal strength, and the service interruption probability. In another embodiment, the above load level further comprises at least one of the usage rate of RB, the BSS load, the on-line number of RRC, the ratio of actual throughput and theoretical throughput, the usage rate of channel, and the CPU load. In another embodiment, the above signal strength further comprises at least one of the RSSI value, the SNR value, and the RSRP value. In another embodiment, the above service interruption possibility further comprises at least one of the packet loss ratio and the packet delay rate.

Figure 3:
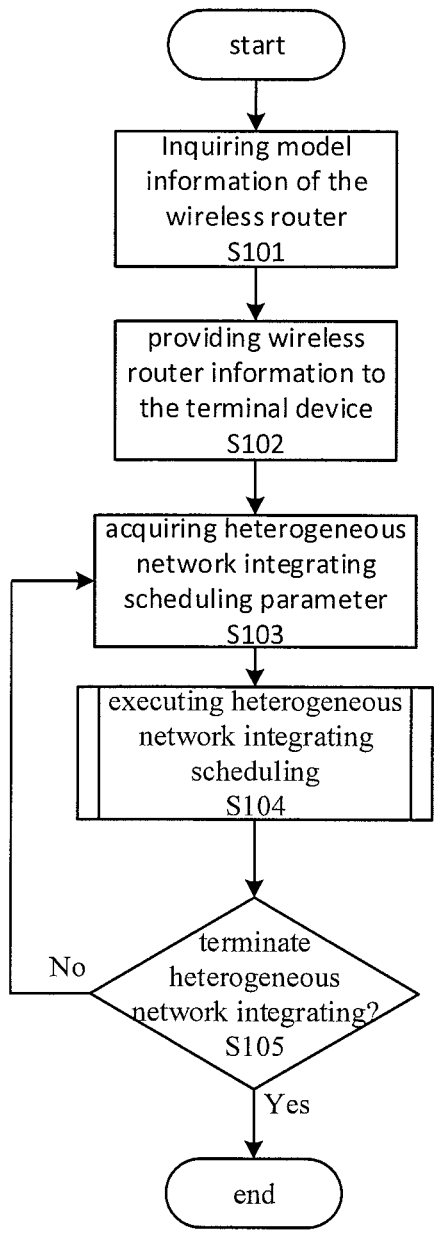
FIG. 3 is a detailed flow chart of splitting scheduling when integrating heterogeneous network.

Hereinafter, the present invention will be illustrated by the first embodiment of the splitting scheduling system, but the second embodiment of the splitting scheduling method can also reach the same or similar technical effects. Please continue to refer to FIG. 3 which is a detailed flow chart of splitting scheduling when integrating heterogeneous network. The internal steps are described as:

Step S101: the heterogeneous network router 11 inquiring the model information of the wireless router 12 and using the parameter instruction list corresponding to different models to give the instruction of inquiring the wireless router 12 so as to acquire the wireless network information.

Step S102: the heterogeneous network router 11 providing the terminal with the wireless router 12 information that may be used for heterogeneous network and may be BSSID, SSID, HESSID and the like of the wireless router 12 according to the mobility set parameters established by 3GPP specification.

Step S103: acquiring the associated operational parameters necessary for heterogeneous network integrating scheduling, which includes the information of the heterogeneous network router 11, the wireless router 12, and the terminal. The associated parameters used by heterogeneous network integrating scheduling may refer to Table 1:

TABLE 1

| | |
|---|---|
| $S_i$, i = L, w | Loading status of LTE/Wi-Fi |
| $L_i$, i = L, w | Load of LTE/Wi-Fi |
| $R_i$, i = L, w | Splitting value of LTE/Wi-Fi |
| $Tx_i$, i = L, w | Tx rate of LTE/Wi-Fi |
| $r_i$, i = L, w | Transmission rate of LTE/Wi-Fi |
| $RU_i = L_i - LB_l$, i = L, w | Transmission rate of LTE/Wi-Fi needing to be reduced |
| $RU_T = r_L * RU_L + r_w * RU_w$ | Sum of the reduced transmission volume of LTE and Wi-Fi |
| $PLR_i$, i = L, w | Packet loss ratio of LTE/Wi-Fi |
| $PLR_T = PLR_L * r_L + PLR_w * r_w$ | Sum of lost data of LTE and Wi-Fi |
| $\alpha_i = \dfrac{MCS_i}{MCS_i + MCS_j}$, i, j = L, w, j ≠ i | MCS ratio of LTE/Wi-Fi |
| 0 ≤ ub ≤ 1 | Upper limit ratio of Wi-Fi that may be transmitted |
| 0 ≤ $LB_i$ ≤ 1, i = μ, l | Upper and lower threshold value of the load of LTE/Wi-Fi |
| PT | Threshold value of packet loss ratio of LTE/Wi-Fi |

Step S104: executing heterogeneous network integrating scheduling by the information acquired in S103.

Step S105: When terminating the function of heterogeneous network integrating, the heterogeneous network router 11 stopping providing the service of wireless network terminal and otherwise continuing to execute the step of S103.

Figure 4:
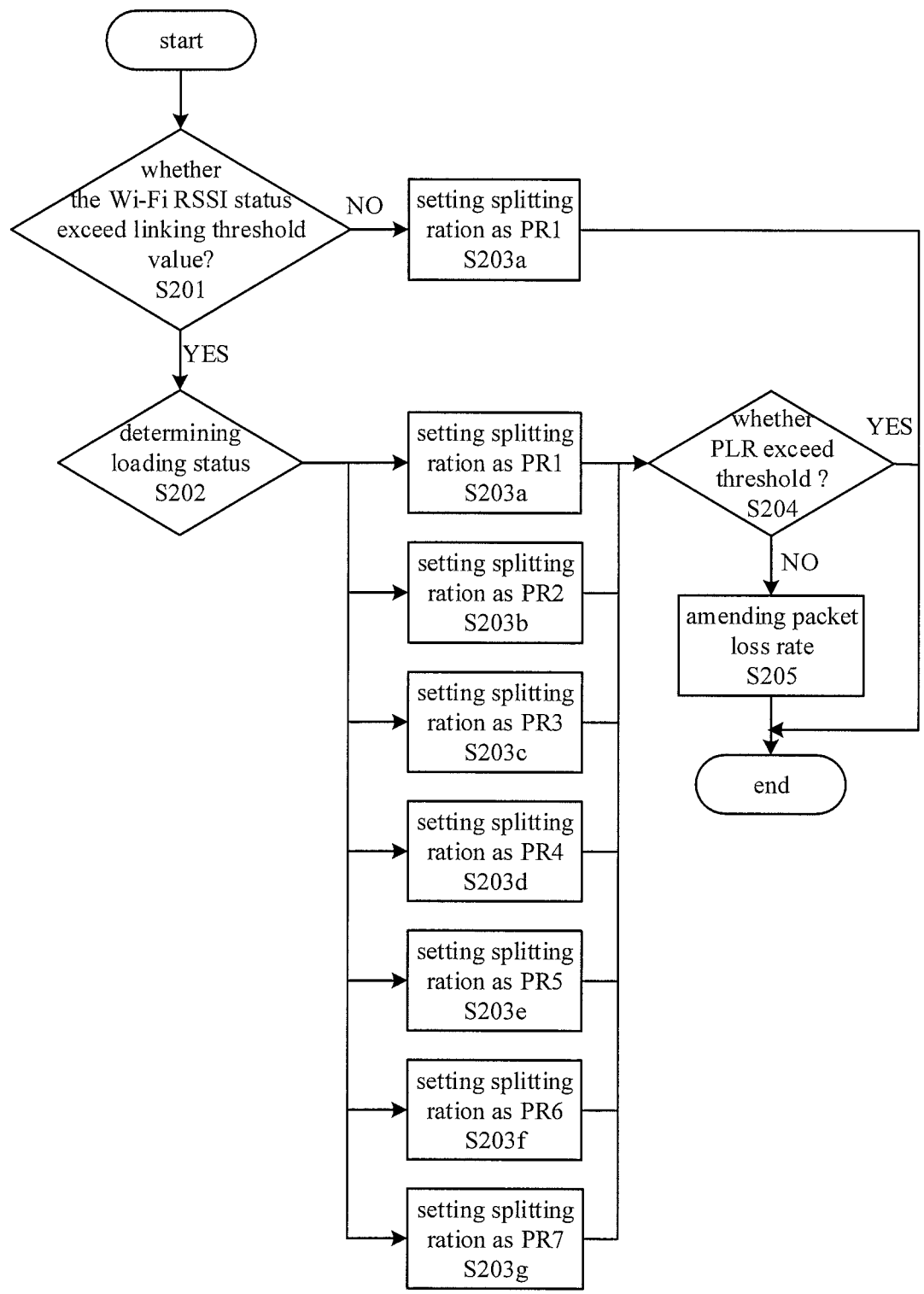
FIG. 4 is a flow chart of the algorithm for integrating the splitting scheduling of the heterogeneous network.

In order to further illustrate the step of heterogeneous network integrating scheduling described in Step S104, please refer to the illustration of FIG. 4. In heterogeneous network integrating scheduling, FIG. 4 will use LTE and Wi-Fi as the mobile network and wireless network transmission technology receptively. When the heterogeneous network integrating scheduling of Step S104 starts, it is determined whether the Wi-Fi RSSI status exceeds linking threshold value, namely, whether the signal can reach the set linking strength, according to Step S201. If it holds and the set object cannot be reached because the Wi-Fi signal for supporting heterogeneous network integrating is difficult to connect or the transmission quality is too bad after connection, then set directly the splitting ration in Step S203a as $PR_1$. If partial data is split to the Wi-Fi terminal, packet loss problem will be caused. Therefore, when this condition is satisfied, transmission of downlink data by LTE entirely will be a better choice and otherwise, it is necessary that the loading status $S_i$ should be determined by Step S202 to decide the classification trend.

The classification of loading status is set as three statuses of lightness, moderation and heaviness according to the relationships between the respective loads $L_i$ of LTE and Wi-Fi and the upper and lower threshold values of load $LB_\mu$ and $LB_l$. The loading status table formed by the permutation and combination of loading statuses of LTE and Wi-Fi has different and corresponding rules of splitting ration wherein the splitting ration may also be divided into the general item, the patching item, the upper limit item and the like. Detailed classification list of loading statuses and splitting ration rules may refer to Table 2 and Table 3.

TABLE 2

| The number of the loading status | $(S_L, S_W)$ |
|---|---|
| $LR_1$ | (H, H) |
| $LR_2$ | (H, M) |
| $LR_3$ | (H, L) |
| $LR_4$ | (M, H) |
| $LR_5$ | (M, M) |
| $LR_6$ | (M, L) |
| $LR_7$ | (L, H) |
| $LR_8$ | (L, M) |
| $LR_9$ | (L, L) |

Note:
H: when $L_i > LB_\mu$ is correct, it represents that the system load is overweight.
M: when $LB_\mu ≥ L_i ≥ LB_l$ is correct, it represents that the system load is moderate.
L: when $Li < LB_l$ is correct, it represents that the system load is light.

TABLE 3

| The number of the splitting rule | $R_L:R_W$ |
|---|---|
| $PR_1$ | 1:0 |
| $PR_2$ | 0:1 |
| $PR_3$ | $Tx_L:Tx_w$ |
| $PR_4$ | $Tx_L + r_w * RU_w:Tx_w - r_w * RU_w$ |
| $PR_5$ | $Tx_L - r_L * RU_L:Tx_w + r_L * RU_L$ |
| $PR_6$ | $Tx_L - r_L * RU_L + RU_T * \alpha_L:Tx_w - r_w * RU_w + RU_T * \alpha_w$ |
| $PR_7$ | $Tx_L:Tx_w * ub$ |

Note:
General item: $PR_1$, $PR_2$, $PR_3$
Patching item: $PR_4$, $PR_5$, $PR_6$
Upper limit item: $PR_7$ When the Step S202 determines that the loading statuses of LTE and Wi-Fi are $LR_4$ or $LR_7$, the practice is the same as but the situation is dissimilar to that when the Step S201 is satisfied. The heterogeneous network splitting scheduling will still set the splitting ration in the Step S203a as $PR_1$, but data transmission is not suitable to be continuously increased anymore because the Wi-Fi terminal is in heavy load status. When the Step S202 determines that the loading statuses of LTE and Wi-Fi are $LR_2$ or $LR_3$, the heterogeneous network splitting scheduling in Step S104 will set the splitting ration in 203b as $PR_2$. Because, at the moment, the LTE system is in overloading status and if LTE is used to continuously transmit data, the data will have difficulty in completing the service terminal due to insufficient resource blocks (RB), thereby causing bad quality of experience (QoE) of the user in the terminal. In contrast, it would be a better splitting method by transferring the data to the Wi-Fi system with a lighter load. If the Step S202 determines that the loading statuses of LTE and Wi-Fi are $LR_9$, the loading rule exhibits that both of the two networks are in light load status and because there is no overloading problem, in order to reach the most efficient data transmission, namely, the maximum rate value of the heterogeneous network integrating, the splitting ration in the Step 203c is set as $RR_3$ and the maximum transmission values that may be reached by LTE and Wi-Fi $Tx_i$ are taken as the respective splitting value $R_i$. When the Step S202 determines that the loading statuses of LTE and Wi-Fi are $LR_6$ or $LR_8$, the splitting scheduling sets the splitting ration in 203e as $PR_5$ and the splitting ration in the Step S203d as $PR_4$ respectively. The difference thereof is that if the load of one side is heavier, it needs to go through load balance and the can-be-transmitted data exceeding the lower limit of load $LB_l$ is transferred to the other side with a lighter load and converted into the acceptable volume by the same. Taking S202 determining that the loading statuses of LTE and Wi-Fi are $LR_5$ as an example, the heterogeneous network splitting scheduling will set the splitting ration in 203f as $PR_6$. In this case, the loading statuses of both of LTE and Wi-Fi are moderate, which is a relatively good situation for the network status and the terminal. When the loading statuses are $LR_5$, the data of LTE and Wi-Fi exceeding the lower limit of load is added up respectively and the respective and optimal MCS ration $\alpha_i$ is used for balancing splitting so as to realize the optimal splitting scheduling ration for the mobile network and the wireless network; Assuming that the Step S202 determines that the loading statuses of LTE and Wi-Fi are $LR_1$, it represents that both of the two networks are in full load status but compared with the condition where Wi-Fi needs to compete based on CSMA/CA mechanism, LTE is more suitable to occupy better transmission ratio under this status. Therefore, the splitting scheduling will set the splitting ration in the Step 203g as $PR_7$, and add an upper limit ratio ub to the splitting ration $R_w$ of Wi-Fi, thereby realizing a germane splitting ration by such a limit.

After completing the determination of the Wi-Fi RSSI status in the Step S201, the determination of loading status in the Step S202 and the steps of setting splitting ration in the Step S203a~the Step S203g and considering the problem of packet loss ratio (PLR), the Step S204 determines whether PLR of the mobile network or the wireless network exceeds the set upper limit threshold of PLR. If the condition is satisfied, it is necessary to amend the packet loss rate in the Step S205. Otherwise, it is unnecessary to execute the Step S205 for amending the packet loss rate. The ways to amend the splitting ration value $R_i$ are determined according to the eight rules listed in Table 5 and the main amendment formulas of amending the packet loss rate are following three items: positive amendment, negative amendment and balance amendment. The main purpose of positive amendment is amending the network with a relatively low loss rate and reaching the effect of an improved and better user experience by assisting in transmitting the data volume lost by another network with a higher loss rate. Negative amendment with the same spirit as the positive amendment enables the network with a lower loss rate to transmit the data volume lost by the network with a higher loss rate, and the practice of balance amendment is identical with the spirit of assigning the splitting ration when the Step S202 determines that the loading statuses of LTE and Wi-Fi are $LR_5$ wherein the respective packet loss volume is added up and balance assignment is implemented according to the respective and optimal MCS ratio and each amended splitting ration value is positive.

Two examples will be taken below and the splitting ration value $R_i$ will be amended according to the amendment rules of packet loss ratio. Other cases that are not listed herein all can be amended correspondingly according to the rules listed in Table 5.

Taking the Step S202 determining that the loading statuses of LTE and Wi-Fi $LR_3$ as an example, the splitting ration in 203b is $PR_2$. Assuming that only the packet loss ratio of Wi-Fi PLR, exceeds the set threshold value PT, the acquired initial splitting ration is:

$$0:1 \rightarrow 0:Tx_w$$

As the packet loss ratio of Wi-Fi exceeds the threshold value and the status number of the packet loss ratio set in Table 4 is $PS_2$, it needs to go through packet loss amendment. In addition, as the status of the packet loss ratio of Wi-Fi is E, the amendment rule one of packet loss ratio amendment in Table 5 is applied to obtain the amended ration:

$$0:Tx_w - PLR_w * r_w$$

TABLE 4

| PLR status Number | LTE status | Wi-Fi status |
|---|---|---|
| $PS_1$ | U | U |
| $PS_2$ | U | E |
| $PS_3$ | E | U |
| $PS_4$ | E | E |

Note:
U: when $PLR_i < PT$, it represents that the packet loss ratio is lower than the set upper limit threshold value.
U: when $PLR_i \geq PT$, it represents that the packet loss ratio is higher than the set upper limit threshold value.

TABLE 5

| Number | Rule content |
|---|---|
| 1 | If PLR status is E, execute the negative amendment: $R_i = R_i - PLR_i * r_i$, i = L, w |
| 2 | If PLR status is U, execute the positive amendment: $R_i = R_i + PLR_j * r_j$, i ≠ j, i = L, w |
| 3 | If the two PLR statuses are E and the loading statuses are identical, execute the balance amendment: $R_i = R_i - PLR_i * r_i + PLR_T * \alpha_i$, i = L, w |
| 4 | The amended valve must be positive. $R_i = \max\{0, R_i \pm PLR_i * r_i\}$, i = L, w |
| 5 | If the two loading statuses are different and one of them is L, the other one should execute the negative amendment and the one with the loading status of L should execute the positive amendment. |
| 6 | When the amendment rules 2 and 5 for packet loss ratio occur at the same time, the positive amendment only needs to be executed once. |
| 7 | If the two loading statuses are different, one loading status is H and the packet loss rate is U, no positive amendment is executed |
| 8 | $R_w$ of the amended splitting ration $PR_7$ is $R_w = \min\{R_w, R_w \pm PLR_w * r_w\}$ |

Although the status of the packet loss rate of LTE is U, satisfying the amendment rule two of packet loss rate, the positive amendment is unnecessary because the amendment rule six of packet loss rate must be satisfied at the same time. Finally, it should be satisfied that the amended splitting ration value $R_i$ is positive. Therefore, the following amended ration may be obtained:

$$0:Tx_w - PLR_w * r_w \rightarrow 0:1$$

As with the above example, if the packet loss ratios of LTE and Wi-Fi exceed the set threshold value PT the status number of the packet loss ratio is $PS_4$, satisfying the amendment rule one of packet loss ratio and the amended ration is obtained:

$$0 - PLR_L * r_L : Tx_w - PLR_L * r_L$$

As the amendment rule four of packet loss ratio is satisfied wherein the two loading statuses are different and one loading status is L, one of them should execute negative amendment and the one with the loading status of L should execute the positive amendment. Therefore, the amended ration is acquired:

$$0-PLR_L*r_L:Tx_w-PLR_L*r_L+PLR_L*r_L$$

As it also should be satisfied that all of the amended splitting ration values $R_i$ are positive, the following amended formula may be obtained:

$$0-PLR_L*r_L:Tx_w-PLR_L*r_L+PLR_L*r_L \rightarrow 0:1$$

After completing the amendment of the packet loss ratio, the heterogeneous network integrating scheduling of the Step S104 is ended and the function of heterogeneous network integrating is determined whether being on or off by the Step S105 again. If the function is still on, the parameters necessary for the splitting scheduling is read by the Step S103 again and then the heterogeneous network integrating scheduling of the Step S104 is executed.

[Features and Effects]

The wireless transmission structure uses the mobile network and the wireless network, namely, heterogeneous network integrating, at the same time and improves the transmission rate by increasing the bandwidth. A splitting method for heterogeneous network integrating provided by the present invention is using the mobile network and the wireless network at the same time to transmit a downlink traffic and determining the splitting ration according to the statues of the mobile network, the wireless network and the terminal so as to realize the features of accelerated transmission, load balance and the like. Compared with other conventional technologies, the method has following advantages:

(1) The splitting scheduling system for integrating heterogeneous network and a method thereof provided by the present invention consider the statuses of the mobile network, the wireless network, and the terminal (the load, the packet loss ratio, the transmission rate and the like) at the same time and can split the heterogeneous network integrating traffic in a more accurate ration.

(2) Considering the classification of loads of the mobile network and the wireless network (light load, moderate load and heavy load), the resource allocation of the heterogeneous network is more flexible.

(3) The status change of the wireless network is combined with the consideration of the terminal and the wireless network router 12 so that it is more sensitive compared with the case in which only a single adjusting mechanism is considered.

(4) Adding the amending ration mechanism for the adjustment of splitting ration according to the transmission status to reach the load balance between the greatest traffic transmission and the fairness of the heterogeneous network integrating.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A splitting scheduling system for integrating heterogeneous network, comprising:
one or a plurality of wireless router, configured to provide a wireless network service for a communication connecting device;
a mobile network core system; and
a heterogeneous network router, connected with the mobile network core system and the wireless router, configured to provide a mobile network service for the communication connecting device;
wherein, when an external terminal device is located in a service covering range of the heterogeneous network router and the wireless router and the terminal device has a heterogeneous network integrating access condition, then the heterogeneous network router enables the terminal device to communicate with the wireless router and the heterogeneous network router in the same time, and then the heterogeneous network router assigns a downlink traffic splitting ration to the terminal device according to a communication status of the wireless router and the heterogeneous network router respectively, wherein the communication status further comprises at least one of loading degree, transmission rate, signal strength, or service interruption probability, wherein the service interruption probability further comprises at least one of packet loss rate,
wherein assigning the downlink traffic splitting ration further comprises:
determining whether RSSI value of the wireless router exceeds linking threshold value;
setting directly the downlink traffic splitting ration when the RSSI value of the wireless router not exceeds linking threshold value, or determining loading status to decide a classification of the loading status and then set the downlink traffic splitting ration when the RSSI value of the wireless router exceeds linking threshold value, wherein the classification of the loading status is set as three statuses of lightness, moderation and heaviness according to relationships between respective loads of the wireless network service and the mobile network service and upper and lower threshold values of loads,
when the loading status of the wireless network service and the mobile network service are heaviness, setting the downlink traffic splitting ration as $T_{XL}:T_{XW}*ub$, $T_{XL}$ and $T_{XW}$ are the maximum transmission values that may be reached by the mobile network service and the wireless network service respectively, and ub is an upper limit ratio to the downlink traffic splitting ration of the wireless network service;
when the loading status of the wireless network service and the mobile network service are moderation, setting the downlink traffic splitting ration by adding up data of the wireless network service and the mobile network service exceeding a lower limit of load respectively and using the respective and the optimal MCS ration; and
amending the downlink traffic splitting ration when the packet loss rate of the mobile network service or the wireless network service exceeds a set upper limit threshold of the packet loss rate.

2. The system as claimed in claim 1, wherein the loading degree further comprises at least one of RB usage rate, BSS loading, RRC linking number, the ratio of actual throughput and theoretical throughput, channel usage rate, or CPU loading.

3. The system as claimed in claim 1, wherein the signal strength further comprises at least one of SNR value, or RSRP value.

4. A splitting scheduling method for integrating heterogeneous network, applied in a splitting scheduling system, comprising:
   determining an external terminal device whether located in a service covering range of a heterogeneous network router of the splitting scheduling system and one or a plurality of wireless router of the splitting scheduling system;
   enabling the heterogeneous network router to determine the terminal device whether having a heterogeneous network integrating access condition, then enabling the terminal device to communicate with the heterogeneous network router and the wireless router in the same time, and enabling the heterogeneous network router to assign a downlink traffic splitting ration to the terminal device according to a communication status of the wireless router and the heterogeneous network router respectively, wherein the communication status further comprises at least one of loading degree, transmission rate, signal strength, or service interruption probability, wherein the service interruption probability further comprises at least one of packet loss rate,
   wherein assigning the downlink traffic splitting ration further comprises:
     determining whether RSSI value of the wireless router exceeds linking threshold value;
     setting directly the downlink traffic splitting ration when the RSSI value of the wireless router not exceeds linking threshold value, or determining loading status to decide a classification of the loading status and then set the downlink traffic splitting ration when the RSSI value of the wireless router exceeds linking threshold value,
   wherein the classification of the loading status is set as three statuses of lightness, moderation and heaviness according to relationships between respective loads of the wireless network service and the mobile network service and upper and lower threshold values of loads,
   when the loading status of the wireless network service and the mobile network service are heaviness, setting the downlink traffic splitting ration as $T_{XL}:T_{XW}*$ub, $T_{XL}$ and $T_{XW}$ are the maximum transmission values that may be reached by the mobile network service and the wireless network service respectively, and ub is an upper limit ratio to the downlink traffic splitting ration of the wireless network service;
   when the loading status of the wireless network service and the mobile network service are moderation, setting the downlink traffic splitting ration by adding up data of the wireless network service and the mobile network service exceeding a lower limit of load respectively and using the respective and the optimal MCS ration; and
   amending the downlink traffic splitting ration when the packet loss rate of the mobile network service or the wireless network service exceeds a set upper limit threshold of the packet loss rate.

5. The method as claimed in claim 4, wherein the loading degree further comprises at least one of RB usage rate, BSS loading, RRC linking number, the ratio of actual throughput and theoretical throughput, channel usage rate, or CPU loading.

6. The method as claimed in claim 4, wherein the signal strength further comprises at least one of SNR value, or RSRP value.

* * * * *